United States Patent
Kikuchi et al.

(10) Patent No.: US 10,293,493 B2
(45) Date of Patent: May 21, 2019

(54) MALE MEMBER AND TOOL CHANGER

(71) Applicant: Nitta Corporation, Osaka-shi (JP)

(72) Inventors: Hiroki Kikuchi, Yamatokoriyama (JP); Kenji Tsurimoto, Yamatokoriyama (JP); Hideki Nishio, Yamatokoriyama (JP); Ryosuke Matsumoto, Yamatokoriyama (JP)

(73) Assignee: Nitta Corporation, Osaka-shi (JP)

( * ) Notice: Subject to any disclaimer, the term of this patent is extended or adjusted under 35 U.S.C. 154(b) by 137 days.

(21) Appl. No.: 15/081,107

(22) Filed: Mar. 25, 2016

(65) Prior Publication Data
US 2016/0279806 A1   Sep. 29, 2016

(30) Foreign Application Priority Data

Mar. 26, 2015 (JP) ................. 2015-064483

(51) Int. Cl.
*B25J 15/04* (2006.01)

(52) U.S. Cl.
CPC ....... *B25J 15/0425* (2013.01); *B25J 15/0466* (2013.01); *B25J 15/04* (2013.01)

(58) Field of Classification Search
CPC .... B25J 15/0466; B25J 15/0425; B25J 15/04; B25J 19/02; B25J 15/0492; Y10S 483/901

(Continued)

(56) References Cited

U.S. PATENT DOCUMENTS 4,644,976 A * 2/1987 Peter .............. F15B 1/24
138/31
4,723,503 A * 2/1988 Yuda .............. B25J 15/0206
116/202

(Continued)

FOREIGN PATENT DOCUMENTS

JP      05-301186 A      11/1993
JP      19950775990 A    3/1995

(Continued)

OTHER PUBLICATIONS

Notification of Reasons for Refusal, prepared by Examiner Daiki Sadamitsu, of the Japanese Patent Office, dated Mar. 5, 2019, in corresponding Japanese Patent Application No. 2015-064483 (including excerpt of English Translation).

*Primary Examiner* — Sunil K Singh
*Assistant Examiner* — Paul M Janeski
(74) *Attorney, Agent, or Firm* — Locke Lord LLP

(57) ABSTRACT

A male member and tool changer for downsizing and preventing damage to proximity sensors; a male member includes a cam adapted to pivot between an engagement position at which the cam engages with a lock pin of a female member and a disengagement position at which the cam moves out of the engagement, and a cylinder unit adapted to pivot the cam between the engagement position and the disengagement position. A first proximity sensor and the second proximity sensor are assembled onto a cylinder sidewall of the cylinder unit and first and second detection surfaces of the proximity sensors are revealed in a cylinder chamber. The first detection surface is placed at a position facing on a piston when the cam is located at the disengagement position and the second detection surface is placed at a position facing on the piston when the cam is located at the engagement position.

5 Claims, 6 Drawing Sheets

(58) Field of Classification Search
USPC .......................................................... 279/900
See application file for complete search history.

(56) References Cited

U.S. PATENT DOCUMENTS

| | | | | |
|---|---|---|---|---|
| 4,763,401 | A * | 8/1988 | Marinoni | B23K 11/318 |
| | | | | 279/119 |
| 5,083,352 | A * | 1/1992 | Nakako | B23Q 5/58 |
| | | | | 29/57 |
| 5,201,838 | A * | 4/1993 | Roudaut | B25J 13/088 |
| | | | | 294/206 |
| 5,662,567 | A * | 9/1997 | Rutschle | B23B 31/00 |
| | | | | 408/239 R |
| 6,729,036 | B2 * | 5/2004 | Denzel | G01B 7/003 |
| | | | | 33/706 |
| 7,963,717 | B2 * | 6/2011 | Seger | F16B 21/165 |
| | | | | 279/50 |
| 8,365,651 | B2 * | 2/2013 | Dorr | F15B 1/08 |
| | | | | 92/5 R |
| 2002/0158394 | A1 * | 10/2002 | Sawdon | B25B 5/122 |
| | | | | 269/32 |
| 2009/0096149 | A1 | 4/2009 | Miyashita et al. | |
| 2016/0059424 | A1 * | 3/2016 | Zachary | B23B 31/30 |
| | | | | 483/1 |

FOREIGN PATENT DOCUMENTS

| | | |
|---|---|---|
| JP | 2009090436 A | 4/2009 |
| JP | 2012-250327 A | 12/2012 |

* cited by examiner

MALE MEMBER AND TOOL CHANGER

BACKGROUND OF THE INVENTION

Field of the Invention

The present invention relates to a male member and a tool changer.

Description of the Related Art

As a tool changer applied to various equipment such as industrial robots, a tool changer equipped with a male member mounted on a robot side and a female member attached to a tool side is known (e.g., Japanese Patent Laid-Open No. 2012-250327). The male member includes a male member body on which a protrusion is formed and a cylinder unit built into the male member body. The protrusion contains plural cams operated in the cylinder unit. Each cam pivots between an engagement position at which the cam is engaged with an engaging member on the female member by projecting from the protrusion and a disengagement position at which the cam is disengaged from the engaging member and retracted into the protrusion. A coupling hole is formed in the female member to accept insertion of the protrusion and the engaging member is provided in the back of an opening made in an inner circumferential surface of the coupling hole. In the tool changer, with the protrusion inserted in the coupling hole, each cam engages with the engaging member, thereby coupling together the male member and female member. Also, by disengaging the cams and the engaging member from each other, the male member and female member can be separated from each other.

In this way, the tool changer can change the tool mounted on an industrial robot.

In the tool changer, to prevent the industrial robot from operating under imperfectly coupled conditions two proximity sensors are installed for each cam to detect whether the cam is at the engagement position or disengagement position. In this case, one of the proximity sensors is installed facing on the cam at the engagement position and the other proximity sensor is installed facing on the cam at the disengagement position. Also, a configuration is known in which one of the proximity sensors is installed facing on the cam at the engagement position and the other proximity sensor is installed at a position facing on a piston in a cylinder unit when the cam reaches the disengagement position (see Japanese Patent Laid-Open No. 5-301186).

With the configuration in which two proximity sensors are installed for each cam as described above, it is difficult to downsize the male member. Also, when the proximity sensor is installed facing on a cam, the cam is exposed outside, making it necessary to expose at least part of the proximity sensor, such as a detection surface, to the outside and thereby raising fears that the proximity sensor might be damaged.

An object of the present invention is to provide a male member and tool changer which are advantageous for downsizing and capable of preventing damage to proximity sensors.

SUMMARY OF THE INVENTION

The present invention provides a male member of an automatic tool changer, the male member being mounted on a main body side of equipment and coupled to a female member mounted on a tool side, the male member comprising: a cylinder unit equipped with a piston, a cylinder chamber housing the piston, and a piston rod coupled at one end to the piston, the piston rod moving back and forth as the piston reciprocates in the cylinder chamber; a cam provided corresponding to an engaging member of the female member, the cam being configured to be pivotable between an engagement position at which the cam engages with the engaging member and a disengagement position at which the cam disengages from the engaging member, the cam pivoting between the engagement position and the disengagement position when the piston rod moves back and forth; a first proximity sensor configured to reveal a first detection surface in the cylinder chamber, the first proximity sensor being placed at a position facing on the piston when the cam is located at the disengagement position, the first proximity sensor detecting presence or absence of the piston in front of the first detection surface; and a second proximity sensor configured to reveal a second detection surface in the cylinder chamber, the second proximity sensor being placed at a position facing on the piston when the cam is located at the engagement position, the second proximity sensor detecting presence or absence of the piston in front of the second detection surface.

Also, the present invention provides a tool changer equipped with the male member and the female member.

According to the present invention, the first detection surface of the first proximity sensor is revealed in the cylinder chamber, placed at a position facing on the piston when the cam is located at the disengagement position, and adapted to detect the presence or absence of the piston in front of the first detection surface while the second detection surface of the second proximity sensor is revealed in the cylinder chamber, placed at a position facing on the piston when the cam is located at the engagement position, and adapted to detect the presence or absence of the piston in front of the second detection surface. Consequently, the proximity sensors are not exposed to the outside and thus are prevented from being damaged. Also, because it is enough to provide the first proximity sensor and second proximity sensor for the piston, the number of proximity sensors can be reduced and the male member and tool changer can be downsized.

DETAILED DESCRIPTION OF THE PREFERRED EMBODIMENTS

Figure 1:
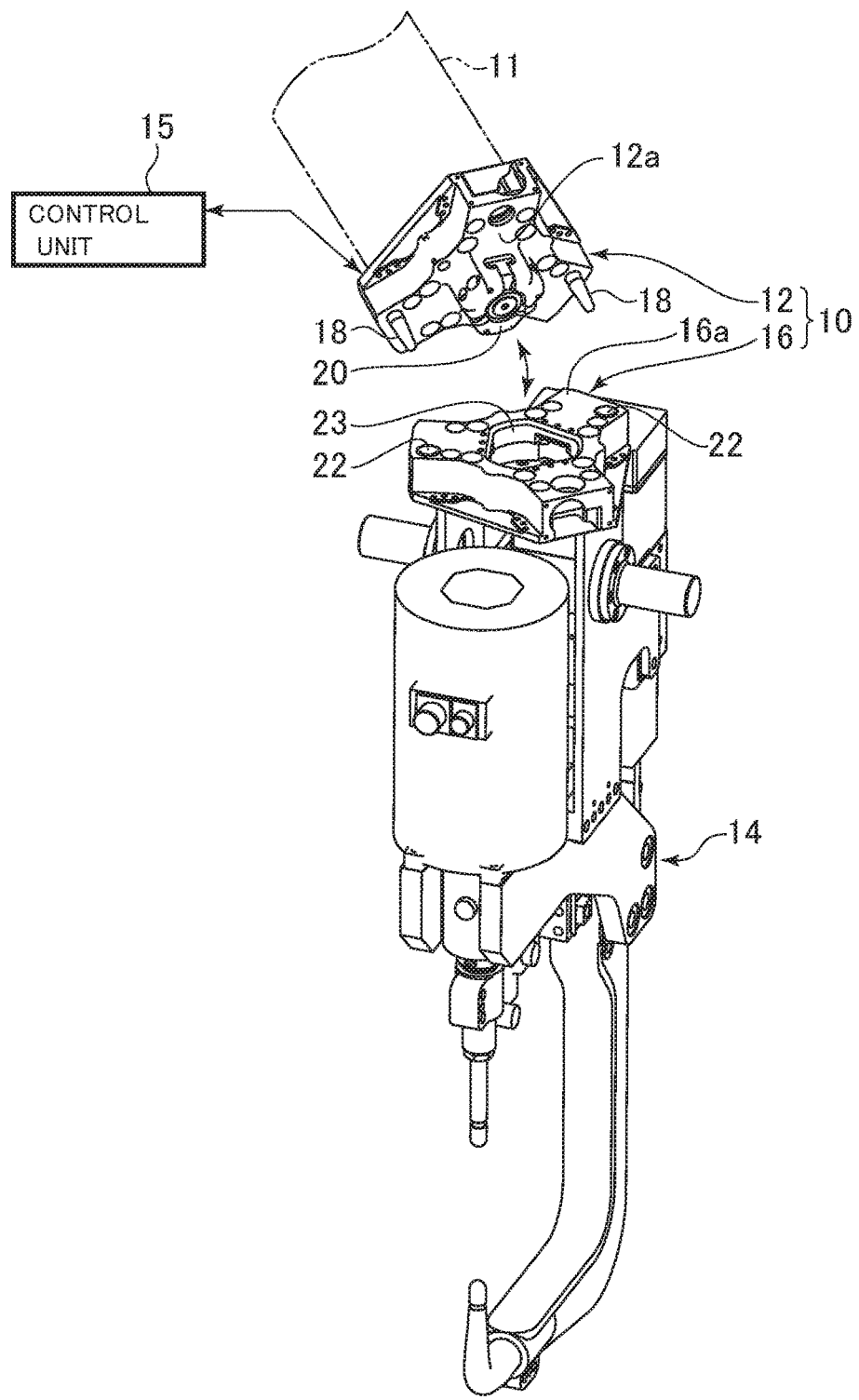
FIG. 1 is a perspective view showing an outline of an industrial robot equipped with a tool changer according to an embodiment.

A tool changer 10 shown in FIG. 1 includes a male member 12 fixed to an end of an arm 11 and a female member 16 fixed to a tool 14, where the arm 11 is a main body of an industrial robot. The arm 11 and the male member 12 as well as the tool 14 and the female member 16 are detachably fastened together by fasteners such as bolts (not shown). In FIG. 1, a spot welding gun is illustrated as a tool 14, but plural different tools 14 with the female member 16 attached thereto are kept ready for use. The arm 11 and the tool 14 are coupled together via the tool changer 10 and configured to be separable, making the tool 14 interchangeable. The male member 12 is connected with a control unit 15, which controls coupling and decoupling of the male member 12 and the female member 16.

The male member 12 has a locating pin 18 installed on a mounting surface 12a and has a protrusion 20 provided at a center. On the other hand, the female member 16 has a locating hole 22 opened in a mounting surface 16a, and a coupling hole 23 provided in a center. During coupling, as the locating pin 18 is inserted into the locating hole 22, the male member 12 is positioned accurately in the female member 16 and the protrusion 20 is inserted into the coupling hole 23. With the protrusion 20 inserted in the coupling hole 23, the male member 12 and the female member 16 are fixed by operating an engagement mechanism as described in detail later. On the other hand, after deactivating the engagement mechanism, by moving the arm 11 in such a direction as to move the male member 12 away from the female member 16, the tool 14 can be separated from the arm 11.

Figure 2:
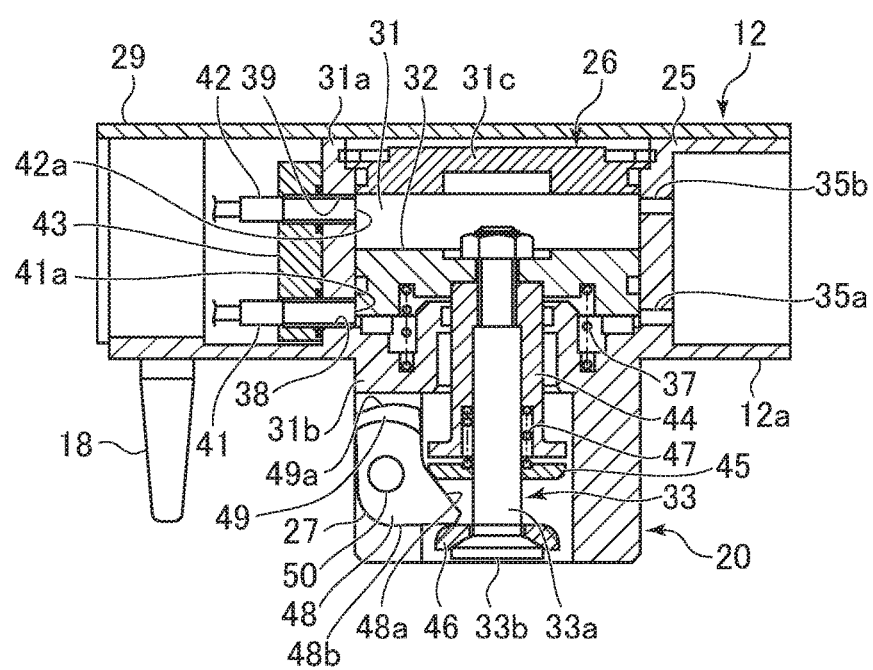
FIG. 2 is a sectional view showing a section of a male member.

As shown in FIG. 2, the male member 12 includes a male member body 25, a cylinder unit 26 installed in the male member body 25, and a cam 27. One face of the male member body 25 is the mounting surface 12a with the locating pin 18 and protrusion 20 provided thereon as described above. The cylinder unit 26 and the cam 27 make up the engagement mechanism adapted to fix the coupling between the male member 12 and the female member 16 in conjunction with a lock pin 28 (see FIG. 3) serving as an engaging member provided on the female member 16. Another face of the male member body 25 is covered with a cover plate 29.

The cylinder unit 26, which is an air cylinder, is intended to pivot the cam 27 and is comprised of a cylinder chamber 31, a piston 32 housed in the cylinder chamber 31, and a piston rod 33 coupled to the piston 32.

The cylinder chamber 31 is made up of a cylinder sidewall 31a and bottom plate 31b formed integrally with the male member body 25 as well as a head cover 31c. The cylinder sidewall 31a serving as a cylinder tube is formed into a cylindrical shape and the bottom plate 31b serving as a rod cover is penetrated by the piston rod 33 while keeping the cylinder chamber 31 airtight. The head cover 31c closes an upper end portion of the cylinder chamber 31 airtightly.

The piston 32 is cylindrical in shape and designed to be movable in an axial direction (up-and-down direction in figures). The piston 32 is made, for example, of aluminum. The piston 32 reciprocates, by pneumatic pressure as described later, between a first position in lower part of the cylinder chamber 31 shown in FIG. 2 and a second position in upper part of the cylinder chamber 31 shown in FIG. 6. When the piston 32 reaches the first position, the cam 27 is moved to a disengagement position at which the cam 27 disengages from the lock pin 28 as described later and when the piston 32 reaches the second position, the cam 27 is moved to an engagement position at which the cam 27 engages with the lock pin 28.

A first intake/exhaust port 35a and a second intake/exhaust port 35b are provided in the cylinder sidewall 31a, penetrating the cylinder sidewall 31a. The first intake/exhaust port 35a opens below the piston 32 at the first position in the cylinder chamber 31 and the second intake/exhaust port 35b opens above the piston 32 at the second position in the cylinder chamber 31. The first intake/exhaust port 35a and second intake/exhaust port 35b are coupled to an intake/exhaust mechanism via piping (not shown). Consequently, when air is sent into the cylinder chamber 31 through one of the first intake/exhaust port 35a and second intake/exhaust port 35b and discharged out of the cylinder chamber 31 through the other intake/exhaust port, the piston 32 is moved to the first position or second position. Note that a coiled spring 37 is biasing the piston 32 toward the second position. To move the piston 32 to the first position, the piston 32 is moved by pneumatic pressure against a biasing force of the coiled spring 37.

The cylinder sidewall 31a serving as a wall of the cylinder chamber 31 has a sensor hole 38 and a sensor hole 39 provided therein, penetrating therethrough. The first proximity sensor 41 and the second proximity sensor 42 are inserted in the sensor hole 38 and the sensor hole 39, respectively, and the first and second proximity sensors 41 and 42 are mounted in this state, in the male member body 25 via a mounting plate 43. The first and second proximity sensors 41 and 42 are intended to detect a position of the piston 32 to sense whether the cam 27 is located at the disengagement position or engagement position. The first detection surface 41a of the first proximity sensor 41 is revealed in the cylinder chamber 31 and placed at a position facing on the piston 32 located at the first position. Similarly, the second detection surface 42a of the second proximity sensor 42 is revealed in the cylinder chamber 31 and placed at a position facing on the piston 32 located at the second position. The first and second proximity sensors 41 and 42 detect the presence or absence of the piston 32 in front of the first and second detection surfaces 41a and 42a, respectively, in a non-contact manner.

In this example, to detect the piston 32 made of aluminum in a non-contact manner, proximity sensors of a high frequency oscillation type (induction type) are used as the first and second proximity sensors 41 and 42. The detection method of the first and second proximity sensors 41 and 42 are not limited as long as the presence or absence of the piston 32 is detected in a non-contact manner. The first and second proximity sensors 41 and 42 are connected to the control unit 15, and respective detection results of the first and second proximity sensors 41 and 42 are sent to the control unit 15. Details on installation of the first and second proximity sensors 41 and 42 on the male member body 25 will be described later.

The first proximity sensor 41 and second proximity sensor 42 are configured to be mounted in the male member body 25 and housed in the male member 12. Consequently, the first proximity sensor 41 and second proximity sensor 42 are not exposed to the outside, and there is no danger that the first and second proximity sensors 41 and 42 will be damaged. Also, since the position of the piston 32 is detected by the first proximity sensor 41 and second proximity sensor 42, even if two or more cams 27 are provided as with this example, the two proximity sensors 41 and 42 are sufficient, contributing to downsizing of the male member 12 and tool changer 10.

The mounting plate 43 is made of SUS304 (stainless steel). The use of the mounting plate 43 made of SUS304 in this way makes it possible to reduce noise superimposed on detection signals outputted from the first proximity sensor 41 and second proximity sensor 42 more greatly than the use of an aluminum mounting plate, and thus is advantageous in preventing false detection.

The piston rod 33 is coupled at a proximal end to the piston 32, and projects into the protrusion 20 on a distal side by penetrating the bottom plate 31b. The piston rod 33 moves back and forth in the axial direction of the piston 32 when the piston 32 reciprocates. An outer casing 44 cylindrical in shape is fixed to that circumferential surface of the piston rod 33 which projects into the protrusion 20 and moves integrally with the piston rod 33. The outer casing 44 is designed to be larger in diameter at a distal end than on a proximal side. Also, a large-diameter portion 33b larger in diameter than a rod body 33a is formed on the distal end of the piston rod 33.

A first sliding member 45 and a second sliding member 46 adapted to pivot the cam 27 are disposed between the outer casing 44 and the large-diameter portion 33b. Both the first sliding member 45 and the second sliding member 46 are shaped like a doughnut with a hole formed in a center of an approximate disk shape and the rod body 33a is passed through the center hole. The first sliding member 45 is disposed on the side of the outer casing 44 and has its movement in a proximal direction of the piston rod 33 restricted by the outer casing 44. Also, a coiled spring 47 is disposed between the outer casing 44 and the first sliding member 45 to bias the first sliding member 45 toward a distal direction of the piston rod 33. The second sliding member 46 is disposed on the side of the large-diameter portion 33b, and has its movement in the distal direction restricted by the large-diameter portion 33b. The cam 27 is sandwiched between the first sliding member 45 and the second sliding member 46 and thereby prevented from pivoting unless caused by the back-and-forth movement of the piston rod 33.

Figure 6:
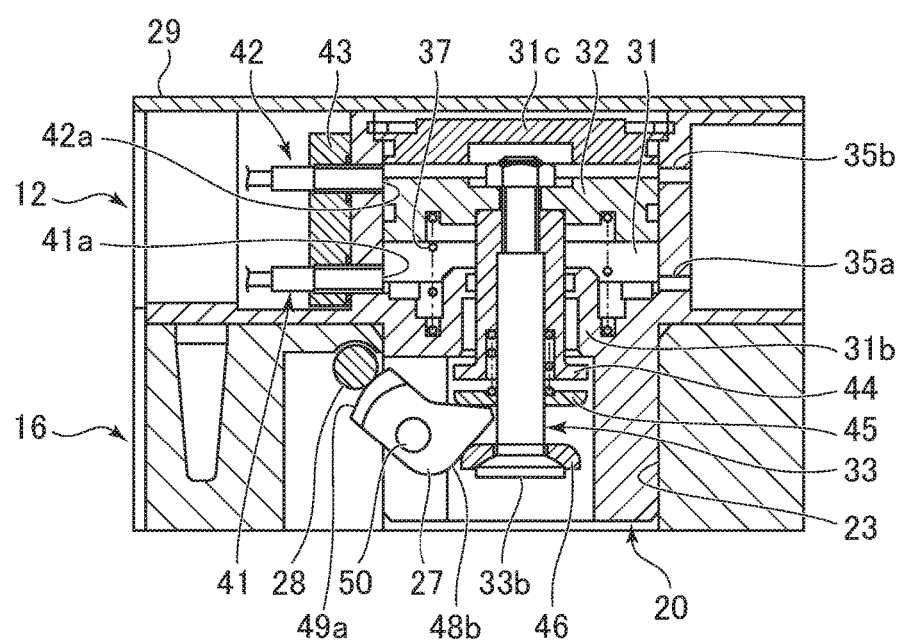
FIG. 6 is a sectional view showing how the male member and female member are coupled together.

Plural cams 27 are disposed on an outer circumference of the piston rod 33. In this example, three cams 27 are disposed at equal intervals on a circumference centered on the piston rod 33. The cam 27 is substantially T-shaped, being made up of a tabular sliding portion 48 and an engaging portion 49, which are formed integrally, where the sliding portion 48 has an appropriate thickness and the engaging portion 49 is formed at one end of the sliding portion 48 and elongated in a thickness direction of the sliding portion 48 (in the direction perpendicular to the plane of the paper). The cam 27 is mounted pivotably in the protrusion 20 via a supporting shaft 50 penetrating the sliding portion 48 in the thickness direction. The shaft 50 is disposed in a direction orthogonal to an axial direction of the piston rod 33. The cam 27 pivots between the disengagement position at which the cam 27 disengages from the lock pin 28 of the female member 16 by being retracted in the protrusion 20 as shown in FIG. 2 and the engagement position at which the cam 27 engages with the lock pin 28 by partially projecting from the protrusion 20 as shown in FIG. 6.

The sliding portion 48 includes a first sliding surface 48a which faces toward the piston rod 33 when the cam 27 is located at the disengagement position and a second sliding surface 48b connected to the first sliding surface 48a on a side opposite the engaging portion 49. The first sliding surface 48a is curved inward and the second sliding surface 48b is flat. Note that a flat surface approximately orthogonal to the second sliding surface 48b is formed between the engaging portion 49 and the second sliding surface 48b. The engaging portion 49 is curved outward and an outer circumferential surface of the engaging portion 49 is an engagement surface 49a adapted to engage with the lock pin 28.

The first sliding member 45 is held to the first sliding surface 48a under the biasing force of the coiled spring 47. As the first sliding member 45 is pressed against the first sliding surface 48a under the biasing force of the coiled spring 47, the cam 27 pivots the second sliding surface 48b so as to come into contact with the second sliding member 46 and is held by being completely retracted into the protrusion 20. When the piston 32 moves from the first position to the second position, the second sliding member 46 moves as a result, causing the second sliding surface 48b to be pressed, and consequently the cam 27 moves from the disengagement position to the engagement position. Also, when the piston 32 moves from the second position to the first position, the first sliding member 45 moves as a result, causing the first sliding surface 48a to be pressed, and consequently the cam 27 moves from the engagement position to the disengagement position. Also, in this way, when the piston rod 33 moves back and forth along with the reciprocation of the piston 32 between the first position and the second position, the cam 27 pivots between the disengagement position and the engagement position.

Figure 3:
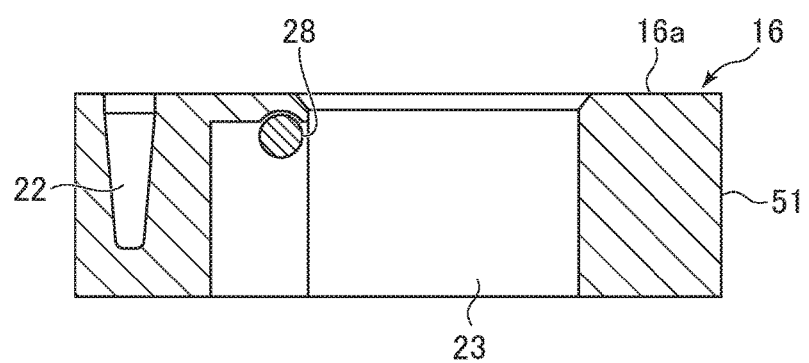
FIG. 3 is a sectional view showing a section of a female member.

As shown in FIG. 3, the female member 16 includes a female member body 51 and the lock pin 28 fixed to the female member body 51 to serve as an engaging member. The female member body 51 has the coupling hole 23 provided therein, penetrating therethrough. Also, one face of the female member 16 provides the mounting surface 16a in which the locating hole 22 is opened, as described above. An opening is provided in that part of the inner circumferential surface of the coupling hole 23 which corresponds to the position of each cam 27 and the lock pin 28 is provided in the back of the opening. The lock pin 28 is columnar in shape and provided in parallel to the shaft 50 of the cam 27. Each lock pin 28 is engaged with the engagement surface 49a of the cam 27 pivoted to the engagement position. Consequently, the male member 12 and the female member 16 are coupled together. Note that the engaging member is not limited to the columnar lock pin 28.

Figure 4:
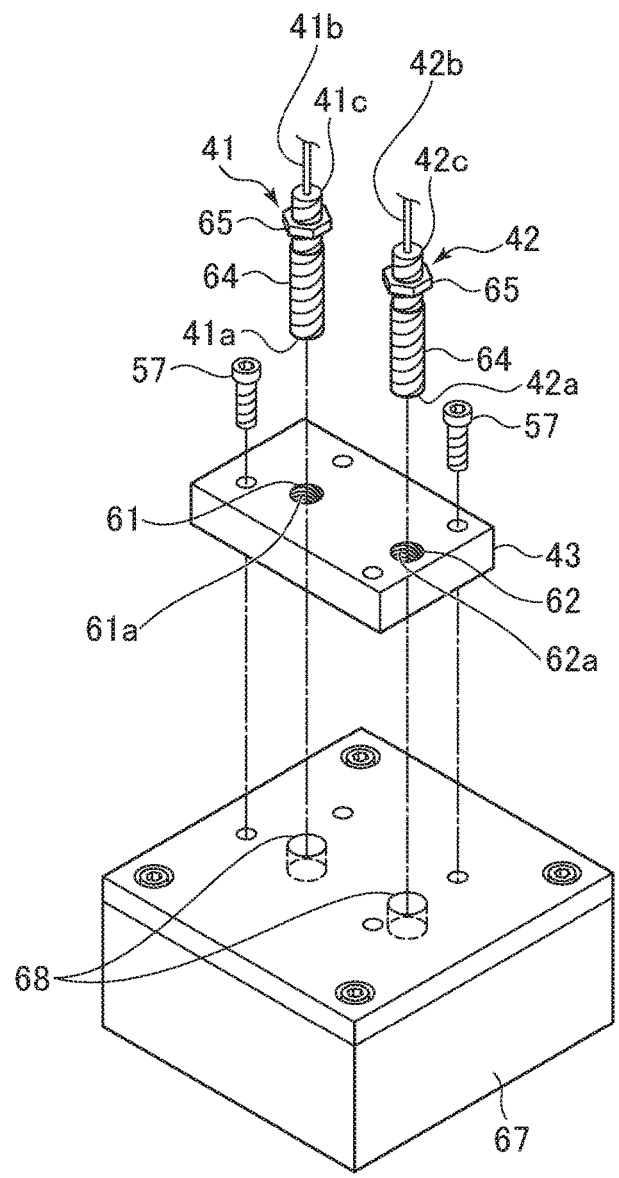
FIG. 4 is a perspective view describing how to mount first and second proximity sensors on a mounting plate.

As shown in FIG. 4, the first proximity sensor 41 has a cylindrical case and has the first detection surface 41a on a front end. Also, the first proximity sensor 41 has a lead wire 41b at a rear end to output a detection signal according to a detection state of the first detection surface 41a. Similarly, the second proximity sensor 42 has the second detection surface 42a on a front end of a cylindrical case and has a lead wire 42b at a rear end.

Holding holes 61 and 62 are formed in the mounting plate 43 with the same center distance as the sensor holes 38 and 39. The first proximity sensor 41 and the second proximity sensor 42 are assembled onto the mounting plate 43 as male threads 41c and 42c formed on an outer circumferential surfaces are screwed into female threads 61a and 62a formed in inner circumferential surfaces of the holding holes 61 and 62. During the assembly, an appropriate amount of sealing tape (tape sealer) 64 is wound around each of the male threads 41c and 42c before the male threads 41c and 42c are screwed into the female threads 61a and 62a. Consequently, gaps between the mounting plate 43 and first proximity sensor 41 as well as between the mounting plate 43 and second proximity sensor 42 are filled, thereby maintaining airtightness. Note that any excess sealing tape 64 sticking out from the mounting plate 43 is removed. Also, a nut 65 screwed onto each of the male threads 41c and 42c is tightened to ensure that screw joints between the first and second proximity sensors 41 and 42 and the holding holes 61 and 62 will not loosen.

Now, if the first and second proximity sensors 41 and 42 project into the cylinder chamber 31, not only movement of the piston 32 will be hindered, but also the first and second proximity sensors 41 and 42 as well as the piston 32 will be damaged. This makes it necessary to assemble the first and second proximity sensors 41 and 42 so as not to project into the cylinder chamber 31. On the other hand, the first proximity sensor 41 and the second proximity sensor 42 need to be assembled such that distances between circumferential surface of the piston 32 at respective positions and the first and second detection surfaces 41a and 42a will be smaller than a rated working distance (detection range). The rated working distance of the first proximity sensor 41 and the second proximity sensor 42 used in this example is around 0.55 mm and the first and second detection surfaces 41a and 42a need to be assembled by being inserted very slightly into the sensor holes 38 and 39 from an inner circumferential surface of the cylinder chamber 31. Note that the rated working distance of the proximity sensor is the distance at which the proximity sensor is activated when a standard sensing object is brought close to the detection surface in a vertical direction, where temperature changes and voltage fluctuations are not taken into consideration in determining the distance.

When the first and second proximity sensors 41 and 42 are assembled onto the mounting plate 43, adjustments are made at the same time such that the first proximity sensor 41 and the second proximity sensor 42 will not project into the cylinder chamber 31 as described above and that appropriate distances will be provided between the first and second detection surfaces 41a and 42a and the circumferential surface of the piston 32. Then, the mounting plate 43 is assembled onto the cylinder sidewall 31a, eliminating the need to make adjustments after the cylinder sidewall 31a is mounted: adjustments made such that the first proximity sensor 41 and the second proximity sensor 42 will not project into the cylinder chamber 31 and adjustments of the distances between the first and second detection surfaces 41a and 42a and the circumferential surface of the piston 32.

In this example, the first and second proximity sensors 41 and 42 are assembled onto the mounting plate 43, with the mounting plate 43 fixed to a jig 67. A pair of adjustment holes 68 are provided in a flat top face of the jig 67 with the same center distance as the sensor holes 38 and 39. The adjustment hole 68 is set to a depth equivalent to the length by which the first and second proximity sensors 41 and 42 are to be projected from the mounting plate 43. That is, the depth of the adjustment holes 68 is decided based on the above-mentioned rated working distance and thickness of the cylinder sidewall 31a and set very slightly smaller in length than the thickness of the cylinder sidewall 31a. During assembly, with the holding holes 61 and 62 laid over the pair of adjustment holes 68, the mounting plate 43 is fixed on the top face of the jig 67 with screws 57.

The first proximity sensor 41 and the second proximity sensor 42 wound with the sealing tape 64 are inserted into the holding holes 61 and 62 in the mounting plate 43 fixed to the jig 67 as described above and the male threads 41c and 42c are screwed into the female threads 61a and 62a. Then, with the first proximity sensor 41 and the second proximity sensor 42 placed against bottoms of adjustment holes 68, the nuts 65 are tightened. Subsequently, the mounting plate 43 is removed from jig 67. In this way, the mounting plate 43 with the first and second proximity sensors 41 and 42 assembled thereon is obtained, with projection lengths on the side of the first and second detection surfaces 41a and 42a adjusted.

Figure 5:
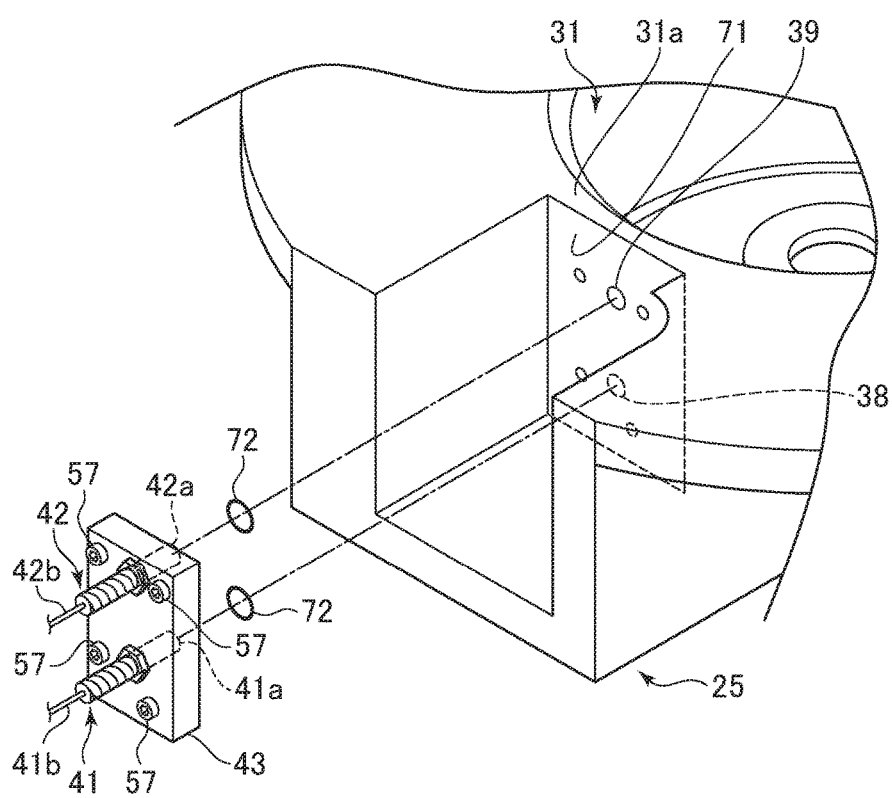
FIG. 5 is a perspective view showing how the first and second proximity sensors are mounted in a cylinder unit.

As shown in FIG. 5, a mounting surface 71 is formed on the cylinder sidewall 31a of the male member body 25 by flattening a part of the outer circumferential surface of the cylinder sidewall 31a. The sensor holes 38 and 39 open at one end in the mounting surface 71, and open at another end in an inner surface of the cylinder chamber 31. Inside diameter of sensor holes 38 and 39 is set equal to or slightly larger than outside diameter of front end portions of the first proximity sensor 41 and second proximity sensor 42. Portions projecting from the mounting plate 43 of the first proximity sensor 41 and the second proximity sensor 42 are inserted in the respective sensor holes 38 and 39, and in this state, the mounting plate 43 is screw-clamped to the mounting surface 71 with screws 57. Consequently, assembly is performed with the distances between the first and second detection surfaces 41a and 42a and the circumferential surface of the piston 32 established appropriately and without the first and second proximity sensors 41 and 42 projecting into the cylinder chamber 31. This eliminates the need to open the cylinder chamber 31 or remove the piston 32 to adjust assembled state of the first and second proximity sensors 41 and 42 during new assembly, maintenance, or the like. Also, there is no chance that the first and second proximity sensors 41 and 42 will be damaged by being brought into contact with the piston 32 during adjustment.

Note that O-rings 72 are used to maintain airtightness between the mounting plate 43 and the mounting surface 71. On that face of the mounting plate 43 which is facing the mounting surface 71, grooves (not shown) are respectively formed around openings from which the first and second proximity sensors 41 and 42 project. The respective O-rings 72 are fitted in the grooves and compressed between the mounting plate 43 and mounting surface 71.

Next, operation of the tool changer 10 configured as described above will be described. To couple the tool 14 to the arm 11, the mounting surface 12a of the male member 12 is placed facing the mounting surface 16a of the female member 16 by moving the arm 11. In this state, air is supplied from the intake/exhaust mechanism to the second intake/exhaust port 35b. Also, air is discharged through the first intake/exhaust port 35a. Consequently, in the cylinder chamber 31, the pressure on the side of the head cover 31c becomes higher than on the side of the piston 32, causing the piston 32 to move, i.e., to descend, toward the bottom plate 31b against the biasing force of the coiled spring 37.

Along with the descent of the piston 32, the piston rod 33 and outer casing 44 descend as well, and the first sliding member 45 presses the first sliding surface 48a of the cam 27 downward by means of the coiled spring 47 disposed between the first sliding member 45 and the outer casing 44. Consequently, the cam 27 rotates around the shaft 50 in the clockwise direction in FIG. 2. Then, when the piston 32 descends to the first position, the cam 27 is placed at the disengagement position. In this way, each cam 27 is retracted in the protrusion 20.

When the piston 32 moves to the first position as noted above, the circumferential surface of the piston 32 comes to face the first detection surface 41a of the first proximity sensor 41. Consequently, the detection signal outputted from the first proximity sensor 41 changes. Based on the change in the detection signal, the control unit 15 senses that the cam 27 moving along with the piston 32 has reached the disengagement position.

Once the control unit 15 senses that the cam 27 is at the disengagement position, the male member 12 is moved toward the female member 16 until the mounting surface 12a abuts the mounting surface 16a, and the protrusion 20 is inserted into the coupling hole 23 as shown in FIG. 6. In this state, air is supplied from the intake/exhaust mechanism to the first intake/exhaust port 35a and air is discharged through the second intake/exhaust port 35b. Consequently, in the cylinder chamber 31, the pressure on the side of the bottom plate 31b becomes higher than on the side of the piston 32, and the pressure, in conjunction with the biasing force of the coiled spring 37, causes the piston 32 to move, i.e., to ascend, toward the head cover 31c.

Along with the ascent of the piston 32, the piston rod 33 and outer casing 44 ascend as well. Consequently, the second sliding member 46 presses the second sliding surface 48b of the cam 27 upward. As a result, the cam 27 rotates around the shaft 50 in the counterclockwise direction in FIG. 6. Then, when the piston 32 ascends to the second position, the cam 27 is placed at the engagement position. In this way, each cam 27 projects radially from the protrusion 20 and the engagement surface 49a engages with the lock pin 28. Consequently, the male member 12 and female member 16 are coupled together.

When the piston 32 moves to the second position as noted above, the circumferential surface of the piston 32 comes to face the second detection surface 42a of the second proximity sensor 42. Consequently, the detection signal outputted from the second proximity sensor 42 changes and the control unit 15 senses that the cam 27 moving along with the piston 32 has reached the engagement position.

Once the arrival of the cam 27 at the engagement position is sensed, the arm 11 moves. Since the male member 12 and the female member 16 are fixed by the cam 27 located at the engagement position, the tool 14 moves with the arm 11. By moving the tool 14 with the arm 11, an operation is performed using the tool 14.

To separate the tool 14 from the arm 11 after a predetermined operation, the tool 14 is moved to a predetermined position, e.g., to a tool holder, using the arm 11. Subsequently, air is supplied from the intake/exhaust mechanism to the second intake/exhaust port 35b. Also, air is discharged through the first intake/exhaust port 35a. Consequently, the piston 32 descends to the first position and the cam 27 pivots to the disengagement position. After the control unit 15 detects, based on the detection signal from the first proximity sensor 41, that the piston 32 has descended to the first position, the arm 11 is moved in such a direction as to space the male member 12 away from the female member 16. Consequently, the tool 14 is separated from the arm 11.

The position of the piston 32 is detected by the first proximity sensor 41 and the second proximity sensor 42 to sense the disengagement position and the engagement position of the cam 27 as described above, and the two proximity sensors handle the same piston 32. Consequently, unlike a configuration in which each of two proximity sensors detects a different part, the first proximity sensor 41 and the second proximity sensor 42 do not produce detection results contradictory to each other.

Also, when the first proximity sensor 41 or the second proximity sensor 42 fails and needs to be replaced, the first proximity sensor 41 and the second proximity sensor 42 are removed from the cylinder sidewall 31a together with the mounting plate 43. Next, the first proximity sensor 41 or the second proximity sensor 42 to be replaced is assembled onto the mounting plate 43 with the projection length adjusted as described above. Then, the mounting plate 43 can be mounted on the mounting surface 71 of the cylinder sidewall 31a. Since the projection lengths of the first proximity sensor 41 and the second proximity sensor 42 have already been adjusted, there is no need to check whether or not the first proximity sensor 41 and the second proximity sensor 42 project into the cylinder chamber 31. Of course, there is no need to open the cylinder chamber 31 or take off the piston 32 either.

Whereas an industrial robot has been cited in the above embodiment as an example of equipment, the equipment on which the tool changer is mounted is not limited to industrial robots. For example, the tool changer may be mounted on a balance arm or hand crane which makes it easy to move a tool mounted on the arm or an object gripped by the tool or carry out operations at a destination. Also, whereas the male member is mounted on the arm of an industrial robot on the main body side of the equipment, the mounting location of the first coupling member may be set at any location on the main body of the equipment according to the configuration and type of the equipment.

What is claimed is:

1. A male member of an automatic tool changer, the male member being mounted on a main body side of equipment and coupled to a female member mounted on a tool side, the male member comprising:
    a cylinder unit equipped with a piston, a cylinder chamber housing the piston, and a piston rod coupled at one end to the piston, the piston rod moving back and forth as the piston reciprocates in the cylinder chamber;
    a cam provided corresponding to an engaging member of the female member, the cam being configured to be pivotable between an engagement position at which the cam engages with the engaging member and a disengagement position at which the cam disengages from the engaging member, the cam pivoting between the engagement position and the disengagement position when the piston rod moves back and forth;
    a first proximity sensor having a first detection surface that extends into the cylinder chamber, the first proximity sensor being placed at a position facing on the piston when the cam is located at the disengagement position, the first proximity sensor detecting presence or absence of the piston in front of the first detection surface;
    a second proximity sensor having a second detection surface that extends into the cylinder chamber, the second proximity sensor being placed at a position facing on the piston when the cam is located at the engagement position, the second proximity sensor detecting presence or absence of the piston in front of the second detection surface;
    a pair of sensor holes provided for the first and the second proximity sensors by penetrating a wall of the cylinder chamber; and
    a mounting plate in which a pair of holding holes are formed to hold the first and the second proximity sensors, the mounting plate holding the first and the second proximity sensors in the pair of holding holes with the first detection surface of the first proximity sensor and the second detection surface of the second proximity sensor respectively projecting on one side of the mounting plate, the mounting plate being mounted on an external wall surface of the cylinder chamber with projecting portions of the first and the second proximity sensors being inserted in the sensor holes.

2. The male member according to claim 1, wherein:
    male threads are formed on outer circumferential surfaces of the first and the second proximity sensors; and
    the mounting plate has female threads formed in inner circumferential surfaces of the pair of holding holes and holds the first and the second proximity sensors as the male threads are screwed into the female threads.

3. The male member according to claim 1, wherein the mounting plate is made of SUS304.

4. The male member according to claim 1, wherein a plurality of the cams are provided corresponding to a plurality of the engaging members of the female member.

5. A tool changer comprising: the male member according to claim 1; and the female member.

\* \* \* \* \*